United States Patent
Kusters et al.

[11] 3,767,286
[45] Oct. 23, 1973

[54] ACOUSTO-OPTIC FILTER HAVING MEANS FOR DAMPING ACOUSTIC RESONANCES

[76] Inventors: John A. Kusters, 736 Sutter Ave., San Jose; David A. Wilson, 1691 McGregor Way, Palo Alto; Laurence M. Hubby, Jr., 1901 Cooley Ave. #1, East Palo Alto, all of Calif.

[22] Filed: Apr. 10, 1972

[21] Appl. No.: 242,513

Related U.S. Application Data

[63] Continuation-in-part of Ser. No. 165,629, July 23, 1971, Pat. No. 3,729,250.

[52] U.S. Cl................................. 350/149, 350/157
[51] Int. Cl................................................. G02f 1/24
[58] Field of Search............................ 350/149, 147

[56] References Cited
UNITED STATES PATENTS

| 3,679,288 | 7/1972 | Harris | 350/149 |
| 3,666,349 | 5/1972 | Hubby, Jr. | 350/149 |
| 3,637,288 | 1/1972 | Seidel | 350/149 |

*Primary Examiner*—John K. Corbin
*Attorney*—Roland I. Griffin

[57] ABSTRACT

Interactive acoustic resonances in an acoustically excited photoelastic optically birefringent crystal of an acousto-optic filter are reduced by inclining the output face of the crystal at such an angle to reflect acoustic wave energy incident on the output face into the side walls of the crystal and preferably out of a plane of interaction defined by the input light polarization vector and the group velocity vector of the acoustic wave.

14 Claims, 7 Drawing Figures

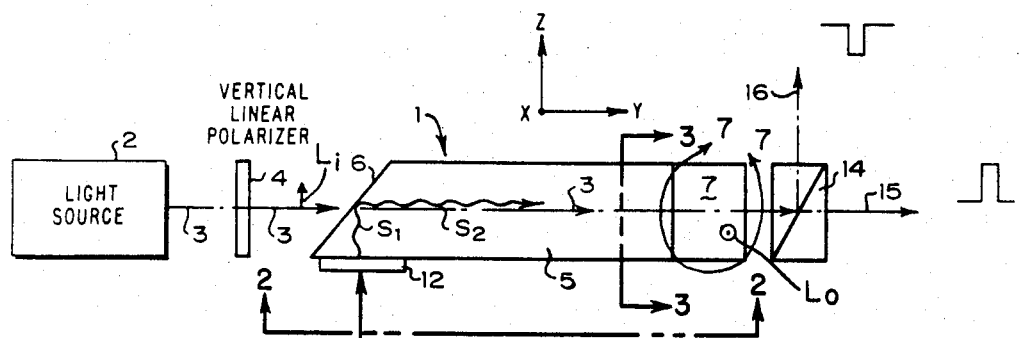
Fig. 1
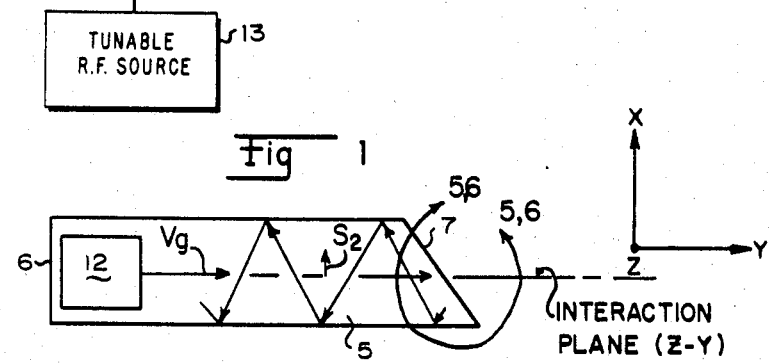
Fig. 2
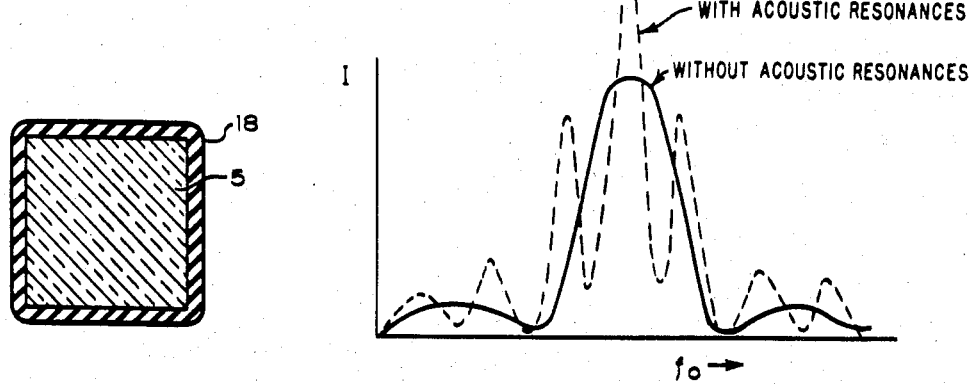
Fig. 3
Fig. 4

ACOUSTO-OPTIC FILTER HAVING MEANS FOR DAMPING ACOUSTIC RESONANCES

RELATED CASES

The present application is a continuation-in-part application of copending U.S. patent application Ser. No. 165,629 filed July 23, 1971, now Pat. No. 3,729,250 and assigned to the same assignee as the present application.

DESCRIPTION OF THE PRIOR ART

Heretofore, electonically tunable acousto-optic filters have been constructed wherein light of a first polarization was collinearly diffracted on an acoustic wave in an optically anisotropic medium, such as a photoelastic birefringent crystal, to shift the polarization of the polarized input light beam at a selected bandpass optical frequency from the first polarization to a second orthogonal polarization. The diffracted light was polarization analyzed to separate the light of the second polarization from light of the first polarization. The bandpass of the filter was electronically tunable by varying the frequency of the acoustic wave within the birefringent crystal.

Such an acousto-optic filter is disclosed in an article titled "Acousto-Optic Tunable Filter" appearing in the Journal of the Optical Society of America, Volume 59, No. 6 of June of 1969, pages 744–747, and in an article titled "Electronically Tunable Acousto-Optic Filter" appearing in the Applied Physics Letters, Volume 15, No. 10, of 15 November 1969, pages 325 and 326.

One of the problems encountered with this prior art acousto-optic filter, which is of the type wherein the light beam is projected through the crystal, is that reflection of acoustic waves from the output end of the crystal back to the input end sets up standing acoustic waves or acoustic resonances within the photoelastic birefringent crystal. These acoustic resonances introduce ripples in the optical bandpass characteristic of the filter, and it is desired to reduce or eliminate these ripples.

SUMMARY OF THE PRESENT INVENTION

The principal object of the present invention is the provision of an acousto-optic filter having means for reducing undesired interactive acoustic resonances.

In one feature of the present invention, the output face of the crystal of an acousto-optic filter is formed at such an angle to the acousto-optic interaction plane of the crystal, such plane being defined by the input light polarization vector and the acoustic wave group velocity vector, so that the acoustic wave energy traveling within the crystal and incident on the output face is reflected from the output face in a direction out of the acousto-optic interaction plane to reduce unwanted interactive acoustic resonances within the crystal.

In another feature of the present invention, the acoustic wave is excited within the crystal and reflected from the input face along the optical beam path for cumulative collinear diffraction with the beam, and the input face is inclined with respect to the interaction plane such that the normal to the input face lies in the interaction plane and the normal to the output face lies out of the interaction plane.

In another feature of the present invention, the photoelastic birefringent crystal of an acousto-optic filter is made of a crystal material which is acoustically anisotropic such that there is a divergence between the group velocity vector and the phase velocity vector of the acoustic wave within the crystal, and the normal to the output face is substantially parallel to the optical beam path and to the group velocity vector of the acoustic wave, whereby the acoustic wave energy is reflected from the output face towards the side walls of the crystal such as to substantially reduce undesired interactive acoustic resonances within the crystal while providing a relatively large beam aperture for the output light beam with a minimum of light loss.

In another feature of the present invention, the output face of the crystal of the acousto-optic filter is inclined at Brewster's angle to the optical beam path for minimizing the loss of output light by reflection at the output face.

Other features and advantages of the present invention will become apparent upon a perusal of the following specification taken in connection with the accompanying drawings.

BRIEF DESCRIPTION OF THE DRAWINGS

FIG. 1 is a schematic line diagram, partly in block diagram form, of an acousto-optic filter incorporating features of the present invention.

FIG. 2 is a side elevational view of a portion of the structure of FIG. 1 taken along line 2—2 in the direction of the arrows.

FIG. 3 is an enlarged sectional view of the structure of FIG. 1 taken along line 3-3 in the direction of the arrows.

FIG. 4 is a plot of optical beam intensity I versus optical frequency $f_o$ depicting the bandpass characteristics of the acousto-optic filter of FIG. 1 with and without acoustic resonances within the photoelastic birefringent crystal.

DESCRIPTION OF THE PREFERRED EMBODIMENTS

Figure 5:
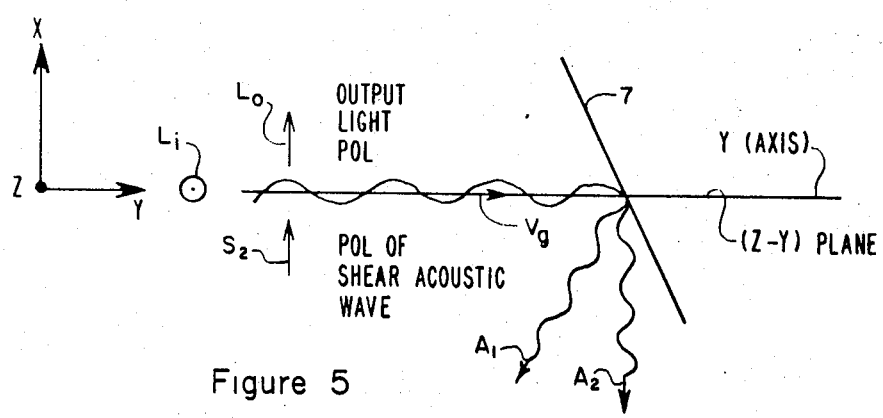
FIGS. 5 and 6 are enlarged detail views of a portion of the structure of FIG. 2 delineated by lines 5—5, 6—6 and depicting the reflection of the acoustic wave energy from the output face for a longitudinal acoustic wave and for a shear acoustic wave, respectively.
Figure 6:
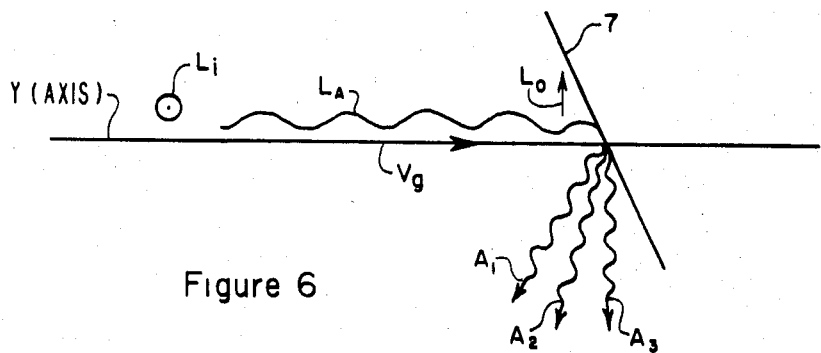

Referring now to FIGS. 1 and 2, there is shown an acousto-optic filter 1 incorporating features of the present invention. Acousto-optic filter 1 is substantially the same as that disclosed in the aforecited Journal of the Optical Society of America. More specifically, the acousto-optical filter 1 includes a light source 2 which projects a beam of light 3 through a vertical linear polarizer 4 into an optically anisotropic photoelastic medium 5, such as a crystal of $LiNbO_3$, $PbMoO_4$, $CaMoO_4$, or quartz. The beam of light is directed against an input face 6 of the crystal 5 at such an angle that the light beam is diffracted through the crystal 5 parallel with the Y axis thereof between the end faces 6 and 7. The Y axis is not necessarily the crystalline Y axis.

The light source 2 may be of any type. For example, it may be a coherent light source, such as a laser, or it may be a broadband light source having a uniform spectral power density, such as a white light source. The input vertical polarizer 4 serves to pass only that light from the source 2 which is polarized in the vertical direction, i.e., the Z direction, to provide a polarized input light beam 3. The input light beam enters input face 6 of the crystal 5 and travels generally along the longitudinal axis (Y axis) of the crystal 5 and passes out the opposite end face 7 of the crystal 5 as an output beam 3.

An acoustic transducer 12 is mounted in intimate contact with the crystal 5 and is connected to a suitable signal generator or source 13, such as a radio frequency tunable oscillator. The acoustic transducer is driven by the radio frequency source 13 to excite a shear acoustic wave $S_1$, which is directed against the inside surface of the input face 6 to be internally reflected therefrom and to be converted into a second shear wave $S_2$, which propagates down the Y axis of the central collinearly with the incident light beam 3.

For a particular combination of light wave and acoustic wave frequencies, there is found to be a strong interaction between the light wave and the acoustic wave in which the acoustic wave diffracts a portion of the light wave from the polarization orientation of the input beam 3 into an orthogonal polarization. This yields a narrow band of light of orthogonal polarization which is separated from the output beam 3 by means of a polarization analyzer 14, such as a Rochon or Glan-Taylor prism.

Polarization analyzer 14 is oriented to pass that portion of the output beam 3 having a cross-polarization to the polarization of the input polarizer 4, namely, in the horizontal direction, as output beam 15. Output beam 15 then comprises a bandpass output characteristic. That portion of the light of the output light beam 3 which has the same polarization as the input beam is reflected as a second output beam 16 via the polarization analyzing prism 14. Output beam 16 comprises all the input vertically polarized light minus that portion or notch of the light which has been converted from the vertical polarization to the horizontal polarization. Thus, output beam 16 has a band reject or notch band characteristic.

That light which is diffracted from the input polarization to the crossed or othogonal polarization has an optical frequency related to the frequency of the acoustic wave $f_a$ by the following relation:

$$f_o = c\, f_a/V\ \Delta n$$

where $c/V$ is the ratio of the light velocity in vacuum to the acoustic velocity in the medium, and $\Delta n$ is the birefringence of the crystal 5.

In a typical example employing a lithium niobate crystal 5 the acousto-optic filter 1 is tunable from 7,000 to 5,000 Å by changing the acoustic drive frequency from 750 to 1,050 MHz. A passband of less than 2 Å is obtained for output beam 15 when a crystal 5 centimeters long is employed.

In the prior art, the photoelastic birefringent crystal 5 had its input face 6 and output face 7 cut such that the normals to the cut faces both lie in the Z-Y plane of the crystal and such that the acoustic wave energy $S_2$ reaching the output face 7 was reflected toward the side walls of the crystal to minimize the possibility of setting up unwanted acoustic resonances within the crystal. However, it has been found that such acoustic resonances are not entirely eliminated in this manner.

Accordingly, in the present invention, an acoustic absorbing medium is coupled to the sides of the crystal 5, as by coating the crystal 5 with an acoustic absorbing material 18 (see FIG. 3). The acoustic absorbing material 18 preferably is bonded or coupled to the crystal 5 via an intimate bond to assure sufficient coupling between the coating 18 and the crystal 5. In addition, the coating 18 preferably has an acoustic impedance approximately equal to the acoustic impedance of the crystal 5 such that maximum transfer of acoustic power is obtained from the crystal to the acoustic absorbing layer 18. More particularly, the product of density and acoustic velocity in the crystal 5 should be approximately equal to the product of density and acoustic velocity in the coating 18.

In a typical example, the acoustic absorbing coating 18 comprises a relatively low viscosity acoustically lossy epoxy adhesive, i.e. a viscosity between 100 and 500 cp. Such an epoxy is marketed by Epoxy Technology, Inc. of Watertown, Mass. as Epo-Tek 305. This epoxy adhesive is loaded in approximately equal volume portions with a relatively high density material such as tungsten powder. The powder is less than 2 mils in diameter and preferably in the micron size range. The loaded epoxy is coated onto the cleaned and roughened translucent or diffusely reflecting side surfaces of the crystal 5 to assure an intimate bond between the adhesive and the crystal. The acoustic absorbing coating 18 is coated to a thickness of approximately 0.5 millimeter.

Another advantage of using tungsten powder as the acoustic loading material 18 is that tungsten powder absorbs light. In any real acousto-optic filter of this type there is always stray light present which results from scatter at the various surfaces of the input polarizer, input prism, and input end of the birefringent medium, either due to imperfect surface quality or imperfect coatings, or both. This stray light is, in general, depolarized and scattered most strongly in the forward directions. Such light will, if directed through the output face of the acousto-optic filter, degrade the overall signal-to-noise ratio of the device and hence is undesirable. Heretofore in acousto-optic filters much of this stray light was indeed directed through the output face of the device by reflection and/or diffuse scattering at the side walls of the birefringent medium. The method of the present invention overcomes this problem to a large extent because a transparent epoxy cement can be used as a carrier which has an index of refraction much closer than that of air to that of the birefringent medium, causing a substantial amount of the stray light which strikes the side walls of the birefringent medium, and would thus normally be reflected and/or rescattered, to be coupled out of the birefringent medium and absorbed by the tungsten powder.

In addition, the end faces 6 and 7 of the crystal 5 are preferably cut with the normals to the faces lying in orthogonal planes such as the z-y plane and x-y plane, respectively, to reflect acoustic waves in orthogonal planes. Moreover, the output face 7 is preferably cut at Brewster's angle to the Y axis to minimize reflection of the optical beam 3.

More particularly, the input shear wave $S_1$ excited in the crystal 5 is preferably polarized in the X direction and oriented such that upon incidence with the inside surface of input face 6, the input shear wave is converted into a second shear wave $S_2$, which is reflected down the Y axis of the crystal parallel and collinearly with the optical beam 3. The second shear wave $S_2$ is also polarized in the X direction. The input light beam 3 is polarized in the Z direction, as indicated by $L_i$. The input light beam $L_i$ defines with the group velocity vector $V_g$ of the shear wave $S_2$, which is directed along the Y axis of the crystal, an acousto-optic interaction plane, namely, the z-y plane.

The input light wave energy $L_i$, within a certain narrow band of optical frequencies, is collinearly diffracted on the acoustic shear wave $S_2$ into an orthogonal polarization $L_0$ polarized in the X direction as shown in FIG. 5. When the shear wave $S_2$, polarized in the X direction, intercepts the output face 7, with the plane of the output face 7 inclined at an angle to the polarization vector of the shear wave $S_2$, the shear wave is reflected and scattered into a number of different modes, such as indicated by acoustic waves $A_1$ and $A_2$. These reflected waves are generally reflected into a plane defined by the normal to the output face and the group velocity vector of the incident shear wave. Thus, the largest portion of the shear acoustic wave energy is reflected into the x-y plane, which is orthogonal to the acousto-optic interaction plane, namely, the z-y plane. By scattering the reflected acoustic wave energy and by reflecting a preponderance of the acoustic wave energy into an orthogonal plane to the interaction plane, undesired acousto-optic interaction with the reflected acoustic waves is greatly reduced or entirely eliminated. Also, the output face 7 is preferably inclined at Brewster's angle to the light beam which travels along the Y axis to minimize the reflection of light from the output face 7.

Generally, there are two types of crystals 5 of interest. In one type of crystal, the crystal material is acoustically isotropic, that is, the phase and group velocity vectors are collinear for the acoustic wave traveling along the longitudinal axis of the crystal. An example of an acoustically isotropic crystal material is $CaMoO_4$. In the case of a $CaMoO_4$ crystal, the angle between the normal to the output face 7 and the acousto-optic interaction plane (z-y plane) is preferably 26° when the acoustic wave $S_2$ is a pure shear wave polarized in the X direction with its group velocity vector along the Y axis.

The acoustic wave upon which the optical beam is collinearly diffracted need not be a shear wave but may comprise a longitudinal wave $L_A$. Good mode conversion and scattering of such an acoustic wave is obtained upon incidence of the wave upon an inclined output face 7. The output face 7 should preferably be inclined at Brewster's angle to the Y axis in order to minimize reflection and scattering of the output light beam $L_0$. The normal to the output face 7 is preferably inclined out of the acousto-optic interaction z-y plane. Maximum reflection of acoustic wave energy into noninteractive modes is obtained when the plane defined by the normal to the output face and the group velocity vector of the incident acoustic wave is normal to the acousto-optic interaction plane defined by $L_i$ and Vg). acousto-optic interaction plane (defined by $L_i$ and Vg)

Another type of crystal 5 is one which is acoustically anisotropic or is operated in an acoustically anisotropic mode. Such crystalline materials include crystalline quartz, lithium niobate ($LiNbO_3$) and proustite ($Ag_3AsS_3$). In an acoustically anisotropic mode the group and phase velocities are not collinear. In the case of crystalline quartz the acoustic group and phase velocities may diverge by as much as 27°.

Figure 7:
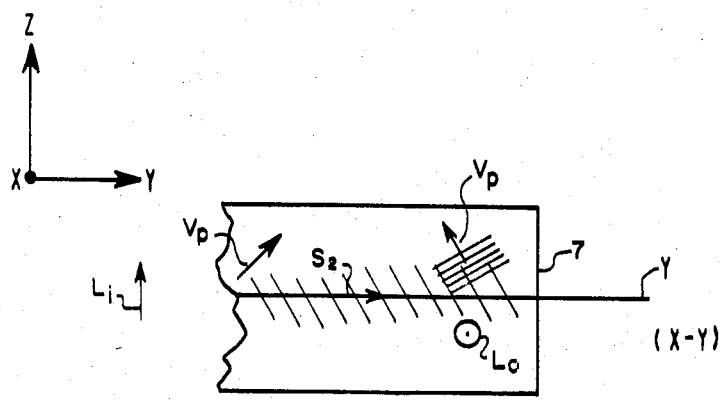
FIG. 7 is an enlarged detail view of a portion of the structure of FIG. 1 delineated by line 7—7 and depicting an alternative output face configuration of the present invention.

Referring now to FIG. 7, there is shown a special end-face configuration, particularly suited for a quartz crystal 5. More particularly, in this example the group and phase velocities of the acoustic shear wave $S_2$ are divergent by as much as 27°. The group velocity vector $V_g$ is directed axially along the crystal collinearly with the path of light beam 3 to define with the input light polarization vector $L_i$ the acousto-optic interaction plane, namely, the z-y plane.

When the acoustic X polarized shear wave $S_2$ is incident upon the output face 7, which is formed with its face normal parallel to the Y axis, the acoustic wave is reflected from the end-face at a substantial angle toward the side-walls of the crystal 5. A substantial portion of the reflected shear wave remains in the acousto-optic interaction plane and is reflected back and forth across the beam path. However, the acoustic wave energy is reflected at such an angle that acousto-optic interactive acoustic resonance is greatly reduced. The advantage of having the output face 7 oriented normal to the path of light beam 3 is that maximum optical output beam aperture is thereby obtained without the requirement of additional prisms and the like, each which would otherwise introduce a loss in the output optical beam light intensity. Also, the complexity of the crystal structure is greatly reduced. In the case of lithium niobate the output face 7 is preferably inclined such that the normal to the output face 7 is at an angle of 30° to the acousto-optic interaction plane. Also for the case of quartz, where the output face 7 is inclined at an acute angle to the beam path 3, optimum performance is obtained when the angle is 30° between the output face normal and the acousto-optic interaction plane.

What is claimed is:

1. In an acousto-optic filter, a photoelastic birefringent crystal having an input face and an output face spaced apart to define a light beam path therebetween, and means for exciting an acoustic wave in said crystal for collinearly diffracting a polarized input light beam on said acoustic wave to shift light of the beam from a first polarization to a second polarization orthogonal to said first polarization, said output face at the intersection thereof with said light beam path having a face normal inclined out of an acousto-optic interaction plane defined by the first polarization vector of said input light beam and the group velocity vector of said acoustic wave, whereby acoustic wave energy reflected from said output face is reflected out of said acousto-optic interaction plane.

2. The apparatus of claim 1 wherein said means for exciting said acoustic wave in said crystal comprises means for exciting a longitudinal acoustic wave.

3. The apparatus of claim 1 wherein said input and output faces are inclined relative to each other such that their respective face normals each define with the group velocity vector of said acoustic wave a pair of substantially orthogonal planes.

4. The apparatus of claim 1 wherein said means for exciting said acoustic wave in said crystal comprises means for exciting a shear mode acoustic wave in said crystal for cumulative collinear diffractive interaction with said input light beam.

5. The apparatus of claim 4 wherein said means for exciting a shear mode acoustic wave includes means for exciting in said crystal an acoustic shear wave with a shear polarization vector substantially orthogonal to the input face normal and directing said acoustic shear wave against the inside surface of said input face to reflect said acoustic shear wave from said input face into a path substantially collinear with said light beam path.

6. The apparatus of claim 1 wherein said output face is also inclined at substantially Brewster's angle relative said light beam path.

7. The apparatus of claim 1 wherein said birefringent crystal material is CaMoO$_4$ and wherein the output face normal lies at an angle of approximately 26° to the acousto-optic interaction plane.

8. The apparatus of claim 1 wherein said birefringent crystal material is LiNbO$_3$ and the output face normal is inclined at an angle of approximately 30° to the acousto-optic interaction plane.

9. The apparatus of claim 1 wherein said birefringent crystal material is crystalline quartz and the output face normal is inclined at an angle of approximately 30° to the acousto-optic interaction plane.

10. In an acousto-optic filter, a photoelastic birefringent crystal having an input face and an output face spaced apart to define therebetween a light beam path, said birefringent crystal being made of an acoustically anisotropic material, and means for exciting an acoustic wave in said crystal for collinearly diffracting a polarized light beam on said acoustic wave to shift light of the beam from a first polarization to a second polarization orthogonal to said first polarization, said acoustic wave having a group velocity vector collinear with said light beam path and having a phase velocity vector oriented at an angle to said light beam path, and said output face at the intersection thereof with said light beam path having a face normal lying generally parallel to the group velocity vector of said acoustic wave and at an angle to the phase velocity vector of said acoustic wave, whereby acoustic wave energy incident on said output face is reflected toward the side walls off said crystal at an angle to said output face and whereby the output beam aperture is of maximum size.

11. The apparatus of claim 10 wherein said crystal material is quartz.

12. The apparatus of claim 10 wherein said means for exciting said acoustic wave in said crystal comprises means for exciting a shear mode acoustic wave in said crystal for cumulative collinear diffractive interaction with said light beam and for exciting said shear mode acoustic wave with a shear polarization vector substantially orthogonal to the input face normal and for directing said shear mode acoustic wave against the inside surface of said input face to reflect said shear mode acoustic wave from said input face into a path substantially collinear with said light beam path.

13. An acousto-optic filter comprising an elongated photoelastic birefringent crystal having inclined input and output end faces with the normals to said end faces lying in orthogonal planes, means for directing a polarized beam of light through said photoelastic birefringent crystal, means for directing an acoustic wave collinearly with the polarized beam of light through said photoelastic birefringent crystal to shift a portion of the polarized beam of light from a first polarization to an orthogonal second polarization, and a coating of acoustic and light energy absorbing material on the sides of said photoelastic birefringent crystal to damp undesired acoustic resonances and stray light.

14. An acousto-optic filter as in claim 13 wherein said output end face is disposed at approximately Brewster's angle to the longitudinal axis of said photoelastic birefringent crystal, whereby reflection of the light beam from said output end face is minimized.

* * * * *